(No Model.) 3 Sheets—Sheet 3.
E. B. HAYES.
GANG BIT BORING OR MORTISING MACHINE.
No. 567,097. Patented Sept. 1, 1896.
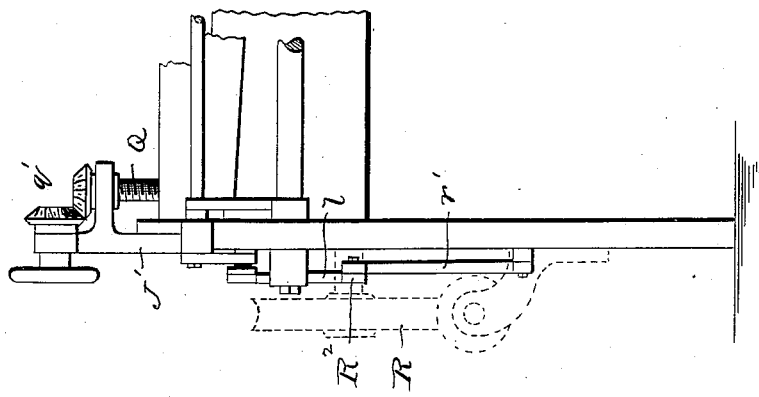
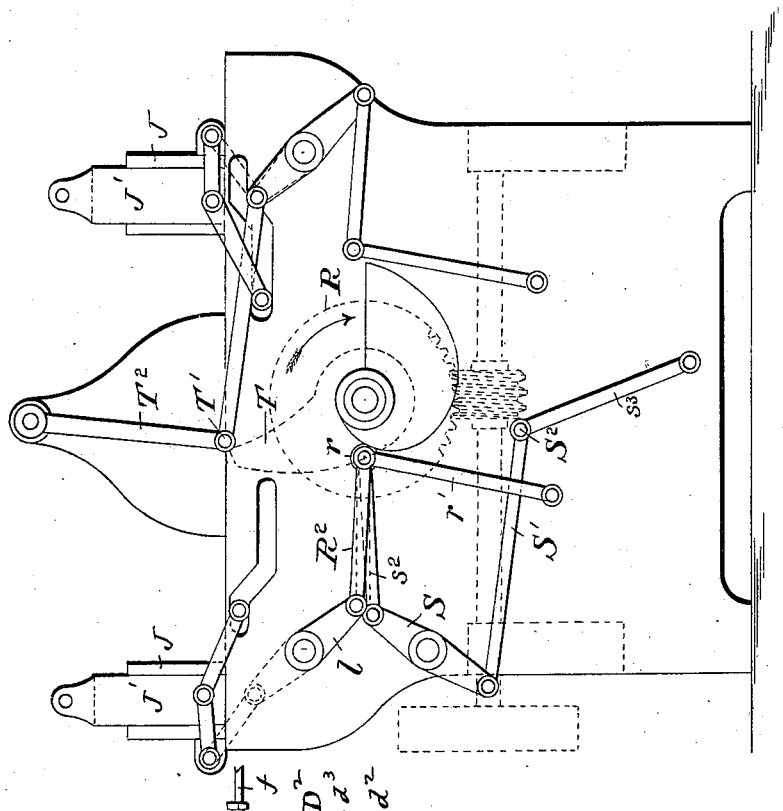
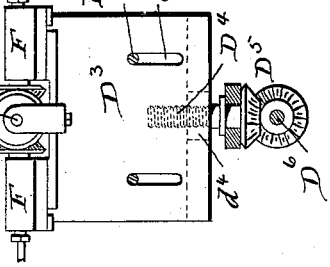
Witnesses:
Inventor:
E. B. Hayes,
by Graham & Low
attys
THE NORRIS PETERS CO., PHOTO-LITHO., WASHINGTON, D. C.

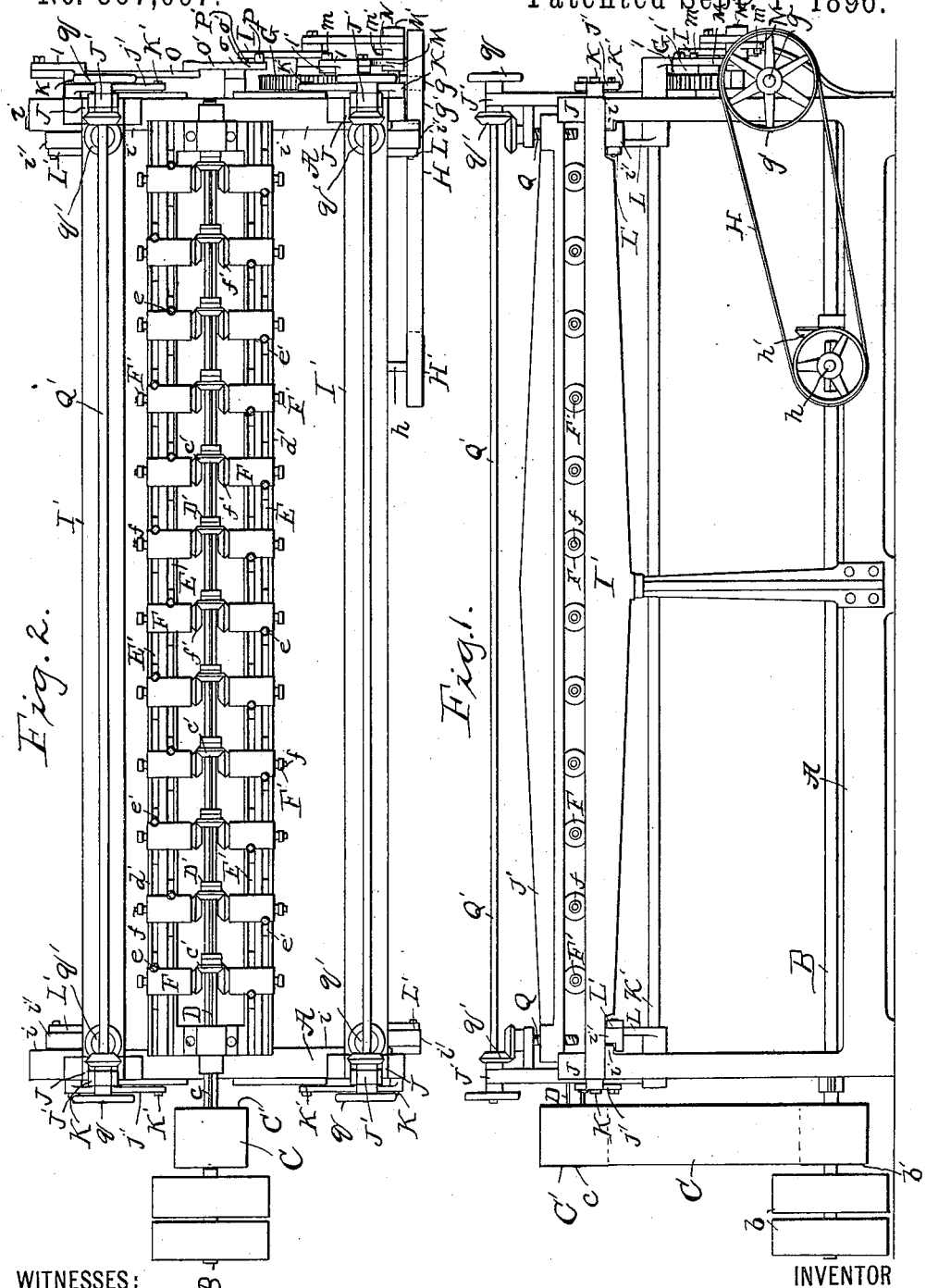

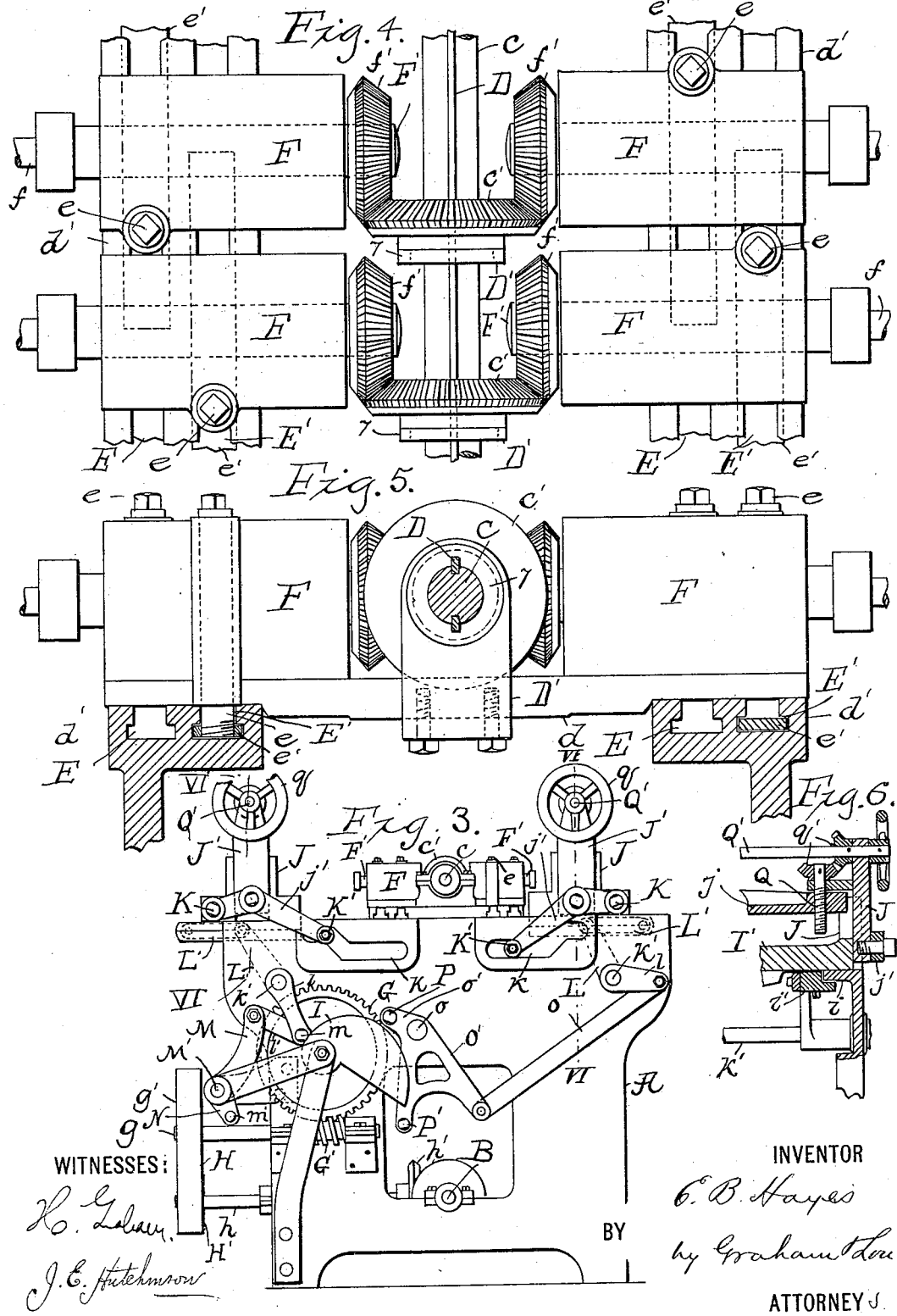

UNITED STATES PATENT OFFICE.

ELI B. HAYES, OF OSHKOSH, WISCONSIN.

GANG-BIT BORING OR MORTISING MACHINE.

SPECIFICATION forming part of Letters Patent No. 567,097, dated September 1, 1896.

Application filed September 4, 1895. Serial No. 561,393. (No model.)

*To all whom it may concern:*

Be it known that I, ELI B. HAYES, a citizen of the United States of America, residing at Oshkosh, Winnebago county, Wisconsin, have invented certain new and useful Improvements in Gang-Bit Boring or Mortising Machines, of which the following is a specification.

My present invention has for its object certain improvements in the construction and mode of operation of machines for boring and mortising, to the end that these operations may be more rapidly performed, the work or lumber held more securely, the holes or mortises located more accurately in the work, and the operation of the machine attended with less exertion on the part of the person attending it.

My improvements relate more particularly to the means for mounting and driving the boring or mortising bits and to the means for automatically clamping and releasing the work and presenting it to the bits.

With such objects in view the invention consists in the parts and combinations thereof hereinafter set forth and claimed.

In order to make the invention more clearly understood, I have shown in the accompanying drawings means for carrying it into practical effect without limiting my improvements in their useful applications to the particular construction which for the sake of illustration I have delineated.

In said drawings, Figure 1 is a side view of a boring or mortising machine embodying my invention. Fig. 2 is a plan view of the upper portion of the same. Fig. 3 is an end elevation. Fig. 4 is a plan view showing four of the boring-bits or portions thereof, together with means for mounting and driving them. Fig. 5 is an elevation of the same. Fig. 6 is a vertical longitudinal sectional view of a portion of the machine on line VI, Fig. 3. Fig. 7 is an end view of the center beam and parts carried thereby. Fig. 8 is an end elevation showing another form of mechanism for actuating the work clamps and carriages also embodying the invention. Fig. 9 is a side view of the same.

Referring to the drawings, A indicates a main frame suitably adapted for the supports of the various moving parts of the machine. In the lower part of this frame is mounted a shaft B, having fast and loose pulleys $b$ for the application of power from any suitable motor (not shown) and having a pulley $b'$ connected by a belt C with a driven pulley $C'$, which is fixed on a longitudinal shaft $c$. This latter shaft is mounted in the upper part of the frame and is provided with a series of bevel or miter gear-wheels $c'$. The hubs of these wheels are interiorly grooved, Fig. 5, and are connected so as to rotate with the shaft by feathers D, fixed in the shaft and entering said grooves. The gear-wheels $c'$ are thus freely adjustable lengthwise of the shaft and are held in place by brackets $D'$, which engage the hubs 7 of said wheels, Figs. 4 and 5, and are in turn fixed upon carriages $d$. At their outer ends the latter are mounted upon a center beam $D^2$, which is mounted on the main frame and is provided with undercut grooves E E'. The carriages $d$ are held in place in these grooves or guides by bolts $e$, which engage said grooves and are fixed in the carriage in such manner that by turning the square upper ends of the bolts the carriage may be clamped upon its guides. This is preferably effected by providing slides $e'$, fitting within the grooves and extending longitudinally of the machine on each side of the carriage to give the latter a long bearing, and by giving the lower ends of the bolts $e$ a screw-thread engagement with the slides.

In order to enable the carriages $d$ to be adjusted close to each other, Fig. 4, the slides $e'$ of neighboring carriages are arranged out of line with each other, the slides of one carriage engaging, for instance, the grooves E and the slides of the contiguous carriages engaging the grooves E'. On each end of each carriage is cast or attached a bearing F, in which is mounted a bit-arbor $F'$, provided at its outer end with a recess or suitable means for carrying the bit $f$. Each arbor $F'$ has fixed on its inner end a gear-wheel $f'$, which is engaged and actuated by its appropriate gear $c'$. It will be understood that in the adjustment of the various carriages $d$, so as to group the bits in accordance with the requirements of the work, each carriage carries with it its arbors $F'$, gear-wheel $f'$, and gear-wheels $c'$, all in their constant and proper relation to each other.

In the operation of the machine the shaft $c$, and consequently the bits $f$, will be constantly rotated, while the work, situated longitudinally of the machine and at the sides thereof and without and on a level with the bits, is clamped, moved inward toward the bit, and then moved outward and released after the boring and mortising have been performed. According to that part of my invention which relates to the work-holding devices this clamping of the work and reciprocation of the work-holding devices toward and from the bits are performed automatically through suitable mechanical connections with the power-shaft B, as will be hereinafter described, and it is only required of the attendant to place the work in position upon its carriage.

Referring now especially to Figs. 1 and 3, G is a worm-wheel mounted at the end of the machine and driven by a worm $G'$ on a transverse shaft $g$. A pulley $g'$ on the latter is connected by a belt H with a pulley $H'$ on a short transverse shaft $h$, which latter is driven from the power-shaft B by bevel friction-wheels $h'$. I is a cam fixed on the worm-wheel G, or on its shaft, from which cam the movements of the work-carriages inward and outward toward and from the bits are derived. The main or bottom plate or portion of the work-carriage is indicated at $I'$, preferably in the form of a beam extending longitudinally of the machine and resting and sliding at its ends upon guides $i$, formed on the end portions of the main frame of the machine. Grooved guide-blocks $i'$, bolted to the under side of the beam $I'$, engage beneath the inner edges of the guides $i$ and serve to hold the carriage down in place upon said guides during its inward and outward reciprocation. Fixed upon the ends of the lower beam $I'$ are vertical guides J, in which are adapted to reciprocate vertically slides $J'$. Attached to these slides is the upper or movable beam $j$ or member of the work-carriage extending parallel with the beam $I'$ and directly above it. It will be observed that a downward movement of the beam $j$ will serve to clamp the work firmly upon the lower beam or table $I'$, and this may be, and preferably is, done with sufficient force to take out any warp or bend in the stile or other piece of work being operated upon and make it perfectly straight prior to the boring or mortising operation. Pivotally attached to each of the vertical slides $J'$ is a lever $j'$, fulcrumed at K upon the end of the beam $I'$, and at its inner end said lever is provided with a stud or roller $K'$, which fits in a cam-groove $k$, formed in the end frame of the machine or in a suitable plate attached thereto. The cam-groove at each end of the machine is similarly shaped in such manner that the inward movement of the work-carriage will cause the inner ends of the levers $j'$ to be depressed, carrying down with them the work-clamping means $j$ into firm engagement with the work. The further inward movement of the work-carriage carries the work thus clamped upon the boring or mortising bits which produce the desired holes or mortises in the lumber. For effecting such movement of the work-carriage I provide a longitudinal rock-shaft $k'$, mounted in the end frames of the machine and provided with outwardly-extending arms L. These arms are connected by links $L'$ with the beam $I'$ or with the blocks $i'$, secured thereto, so that a rocking of the shaft $k'$ will be accompanied by a reciprocation of the work-carriage. It will be understood that the foregoing description of one of the work-carriages will suffice for both, the two carriages at the opposite sides of the machine being similarly constructed and operated. I prefer, however, to reciprocate them alternately, so that when the work on one carriage is being operated upon by the bits at one side of the machine the work at the other side of the machine has been finished and removed from its gang of bits, thereby relieving the bits and their driving mechanism from the strain of two simultaneous mortising operations and facilitating the feeding of the machine. Each shaft $k'$ has fixed upon its end an arm $l$.

Referring now to the parts shown at the left-hand side, Fig. 3, for the reciprocation of the left-hand work-carriage, $l'$ is a link connecting the arm $l$ with the arm M of a lever which is fulcrumed upon the main frame at $M'$. The arm $l$ is provided with a roller or stud $m$, while a stud $m'$ is carried by the shorter arm N of said lever. Both of these studs are in the path of the cam I, and it will be observed that the operation of said cam is first to carry the stud $m$ in such direction as to cause the shaft $k'$ to move the work-carriage inward, immediately after which the cam I will engage the stud $m'$, which, through the mechanism just described, will reverse the movement of the carriage. By properly proportioning the parts, for instance, by making the lever-arm N one-third of the length of the arm M, I am enabled to move the work-carriage inward with a comparatively slow speed, but to withdraw it after the work has been operated upon at a rate of speed three times as great, thus enabling the machine as a whole to be run at higher speed than would otherwise be practicable. Referring to the parts at the right-hand side of the machine, Fig. 3, the arm $l$ is connected by a link O with the long arm $O'$ of a lever which is fulcrumed at $o$ and has a short arm $o'$, provided with a stud P. $P'$ is a similar stud carried by the lever-arm $O'$. These studs are arranged in the path of the cam in such manner that the right-hand work-carriage will be removed inward with the proper degree of speed and then moved outward with a much greater rate of speed by the successive engagement of the cam with the said studs.

In order to accommodate the work-carriage to the holding of pieces of work of different degrees of thickness, I have made the clamping-beam $j$ vertically adjustable upon the slides J', for instance, by screws Q, which are mounted on said slides and engage screw-threaded openings in the ends of the beam, and by a longitudinal shaft Q', operated by a hand crank or wheel $q$ and which operates the said screws Q through miter-gearing $q'$. I also prefer to enable the series of bits, as a whole, to be vertically adjusted in the machine and relative to the work-holding devices. This I accomplish by providing the center beam $D^2$ with end flanges $D^3$, Fig. 7, in which are formed guiding-slots $d^2$. Bolts $d^3$, passing through said slots and fixed in the end frames, serve to hold the beam in vertical flanges and permit its reciprocation. For the latter purpose I fix on the end frames screw-shafts $D^4$, engaging nuts $d^4$, fixed on the flanges $D^3$, and actuate said shafts at both ends of the machine by two sets of miter-gears $D^5$ and a longitudinal shaft $D^6$.

For some purposes I prefer to arrange the carriage-actuating cam at the center of the machine, as seen at R in Fig. 8. In this construction the link-and-lever mechanism also is somewhat different from that shown in Fig. 3, with a view to attaining greater speed in the return of the work-carriages. $R^2$ is a link connecting the arm $l$ with a stud $r$, which is operated by the cam and guided by a link $r'$. By these devices the carriages, each of which has a similar mechanism, will be gradually moved inward toward the bits. S is a lever pivoted on the main frame at $s$ and having one arm connected with the lever $l$, for instance, through media of a link $s^2$, stud $r$, and link $R^2$. The other arm of the lever S is connected by a link S' with a stud $S^2$, which is guided by a link $s^3$. T is an arm fixed on the cam-shaft and adapted to engage the stud $S^2$, provided the carriage be already at its inmost position, and move it to the position shown in Fig. 8. This will, in a small angle of the rotation of the cam-shaft, retract the carriage ready for another piece of work. In the case of the right-hand carriage, Fig. 8, the lever S may be dispensed with, the stud T' for engagement by the arm T being suspended at the top of the frame by a link $T^2$ and connected with an arm $T^3$, fixed on the axis of the arm $l$ or being a continuation thereof. The outward movement of the studs $S^2$ T' will, through the mechanism described, alternately return the studs $r$ to position near the cam-shaft ready to be again gradually moved outward by the cam.

What is claimed is—

1. The combination with two gangs of oppositely-directed mortising or boring bits, of two work-carriages opposite said gangs, mechanism connected with said carriages whereby they are alternately reciprocated at varying speeds, clamp-beams above said carriages leaving an opening for the horizontal introduction of the work, mechanism at each end of the beams connecting the latter with fixed parts or cams whereby the beams are depressed alternately as the carriages alternately move inward, and a central longitudinal beam or carrier supporting said gangs and vertically adjustable, substantially as set forth.

2. The combination with the bits, of the two opposing work-carriages, longitudinal shafts connected therewith and an intermediate cam mounted on a longitudinal axis and operating said shafts alternately, substantially as set forth.

3. The combination with the bit-gangs and work-carriages, of the cam I, mechanism for operating the same, longitudinal shafts $k$ connected with the carriages, studs $m$ P' connected with said shafts, and in the path of the cam, studs $m'$ P in the path of the cam and connections between the last-mentioned studs and said shafts whereby the latter will be operated at greater speed to withdraw the work-carriages.

4. The combination with the frame, of a series of carriages adjustable thereon, each carriage being provided with two bearings, bit-arbors therein having gear-pinions, a series of gear-wheels each engaging a pair of said pinions, a longitudinal driving-shaft intermediate of said arbors, spanned by the carriages and having a spline or feather connected with said series of gear-wheels, and connections between the carriages and gear-wheels, substantially as set forth.

5. The combination with the main frame, of the work-carriages laterally movable thereon, guides at the ends of each carriage leaving an intermediate space for the introduction of the work from the sides of the machine, clamp-beams above said spaces adjustable at each end on slides fitting in said guides, rock-shafts parallel with the carriages and connected therewith respectively, a longitudinal shaft intermediate between said carriages, longitudinally-adjustable bit-carriages extending transversely of said shaft, bit-arbors arranged in gangs on each side of said shaft and extending toward the carriages, gear-pinions on said arbors, a series of gear-wheels having a tongue-and-groove connection with said shaft and connected with the bit-carriages, mechanism for moving the work-carriages alternately toward the bits, and connections between the clamp-beam slides and the main frame whereby the clamp-beams are operated on the movement of the work-carriages, substantially as set forth.

6. The combination, with the main frame and work-carriages, of the center beam, the bit-arbors and actuating mechanism carried thereby, mechanism for vertically moving said beam simultaneously at each end with its bits and arbors, clamps on the carriages, and mechanism between said clamps and the frame for causing the movement of the carriages to operate the clamp, substantially as set forth.

In witness whereof I have hereunto signed my name in the presence of two witnesses.

ELI B. HAYES.

Witnesses:
G. S. LUSCHER,
JAMES A. MASTERSON.